May 13, 1969 G. R. ARGUE ET AL 3,443,997
SOLID STATE ELECTROCHEMICAL DEVICES
Filed Aug. 1, 1966

INVENTORS.
GARY R. ARGUE
BOONE B. OWENS
BY Henry Kolin
ATTORNEY

United States Patent Office 3,443,997
Patented May 13, 1969

3,443,997
SOLID STATE ELECTROCHEMICAL DEVICES
Gary R. Argue, Woodland Hills, and Boone B. Owens, Calabasas, Calif., assignors to North American Rockwell Corporation, a corporation of Delaware
Continuation-in-part of application Ser. No. 526,839, Feb. 11, 1966. This application Aug. 1, 1966, Ser. No. 573,743
Int. Cl. H01m *11/00, 13/06, 13/00*
U.S. Cl. 136—83                                14 Claims

ABSTRACT OF THE DISCLOSURE

A solid state electrochemical device having an ionically conductive solid electrolyte element. The conductivity-imparting component of the solid electrolyte element has the formula $MAg_4I_5$, where M represents K, Rb, $NH_4$, or Cs, and combinations thereof, Cs being present only as a minor constituent of M.

---

This application is a continuation-in-part of application Ser. No. 526,839, filed Feb. 11, 1966, and since abandoned.

This invention relates to solid state electrochemical devices. It more particularly relates to solid state electric cells in which the electrolyte is a solid material having unusually high ionic conductivity.

Solid state electrochemical devices, particularly solid state electric cells, as well as batteries comprising an assembly of such cells, are known to the art. See U.S. 2,718,539 and Re. 24,408. Such electric cells employ a solid electrolyte and are of particular interest for applications requiring a compact, light-weight cell. These solid state cells are generally advantageous compared with conventional cells and batteries with respect to shelf-life stability, leak-free properties, freedom from pressure buildup during the electrochemical reaction, and flexibility with respect to construction design and miniaturization.

However, as is recognized in the art, and as is pointed out in U.S. Patent 2,930,830, the functional characteristics of a solid state battery depend to a great extent on the nature of the solid electrolyte disposed between the electrodes of the individual cells from which the battery is assembled. This electrolyte serves as an ionic conductor for the transport of current within the cell. Since the ionic conductivity of the solid electrolytes heretofore utilized in solid state cells is low, and the internal resistance of the electric cell is relatively high, even where thin layers of electrolyte are used, it is generally difficult to obtain a suitably high electric current from such solid state electric cells. Thus for maximum efficiency, reliability, and utilization of solid state electric cells, it is desirable to provide a solid electrolyte having as high an ionic conductivity as available, a negligible electronic conductivity, and chemical stability so that side reactions are minimized.

Heretofore, the silver halides have been principally used in solid state electric cells as the best available solid electrolytes. However, these halides show an ionic conductivity at room temperature of approximately $10^{-6}$ ohm-cm.$^{-1}$, so that the resistance of the electrolyte alone is several hundred ohms when the film is made only several microns in thickness. Attempts have been made to enhance the ionic conductivity of the silver halides by adding tellurium to these salts. See U.S. Patent 2,930,830. However, only a relatively small improvement in conductivity is obtained thereby. More recently, Takahashi and Yamamoto have reported in the Journal of the Electrochemical Society of Japan, vol. 32, pp. 664-7 (1964), a solid state cell of much lower internal resistance; this cell uses $Ag_3SI$ as an electrolyte. The conductivity of this electrolyte at room temperature (25° C.) is approximately $10^{-2}$ ohm-cm.$^{-1}$, which is about $10^4$ times greater than that of silver iodide. Although this conductivity of $Ag_3SI$ is markedly higher than that of the silver halide ionic conductors, the need still exists for solid state electric cells utilizing as electrolytes stable solid ionic conductors of higher ionic conductivity. Also, by providing a solid electrolyte element having a higher conductivity, many electrochemical devices are now more feasible for many varied applications.

Accordingly, it is an object of the present invention to provide solid state electrochemical devices using a solid electrolyte element of higher ionic conductivity than heretofore available.

It is another object to provide a solid state electric cell overcoming the disadvantageous features of presently known solid state electric cells.

It is a further object to provide a solid state electric cell utilizing as the solid electrolyte, solid ionic conductors having unusually high ionic conductivity.

In the earlier filed application, S.N. 526,839, there was provided an electrochemical device which included a solid electrolyte element comprising an ionically conductive composition of matter having the formula $MAg_3I_4$, M being selected from the class consisting of K, Rb, $NH_4$, and combinations thereof, together with means for providing a flow of ions through the electrolyte element. It has since been discovered in an intensive study of the MI-AgI system that the conductivity-imparting component of this system is a single-phase solid compound having the formula $MAg_4I_5(MI \cdot 4AgI)$. Thus, the ionically conductive composition of matter having the empirical formula $MAg_3I_4(MI \cdot 3AgI)$ is actually a multiphase mixture of the high conductivity compound $MAg_4I_5$ and of a high resistivity component which may include $M_2AgI_3$ and MI. It has further been found that cesium ions may substitute in the crystal lattice for a minor portion of the K, Rb, and $NH_4$ ions.

Accordingly, in the present invention there is provided a new and improved electrochemical device which includes a solid electrolyte element comprising an ionically conductive composition of matter wherein the conductivity-imparting component has the formula $MAg_4I_5$ where M is a univalent ion selected from the class consisting of K, Rb, $NH_4$, Cs, and combinations thereof, Cs being present only as minor constituent of M, i.e., less than 50 ion percent of M, together with means for providing a flow of ions through the electrolyte element. Illustrative of such electrical devices are solid state electrical timers, coulometers, and adaptive computer components, as well as solid state electric cells and batteries. In each of these devices there is a flow of electric current by a movement of ions through the solid electrolyte element, an associated electrode acting as an electron acceptor and another associated electrode acting as an electron donor.

As an example of a solid state timer, a silver film anode and an inert cathode, e.g., platinum, are provided, with a solid electrolyte element disposed therebetween. An applied voltage strips off a thin film of silver from the anode and exposes an underlying inert metal, suitably platinum. Upon depletion of the active metal film of the anode, the cell becomes polarized, and the voltage across the timer changes markedly. This change in voltage can serve to actuate a signal device such as a relay, light, or alarm. The time interval for the timer may be readily predetermined by the current passing through the cell and the amount of active metal on the film anode.

Solid state electrochemical devices that are of commercial interest are the solid state electric cells and batteries. As a particularly preferred embodiment of the electrochemical devices obtained by this invention, and which will be further described as illustrative of the practice of this invention, there is provided a new and improved solid state electric cell which comprises an anode, a cathode, and a solid electrolyte disposed between the anode and cathode, this solid electrolyte comprising said novel ionically conductive composition of matter whose conductivity-imparting component has the formula $MAg_4I_5$ where M is selected from the class consisting of K, Rb, $NH_4$, Cs, and combinations thereof, Cs being present only as a minor constituent of M. Thus there are provided as the novel solid ionic conductors, used as the conductivity-imparting component of the solid electrolytes of these cells, the compounds $KAg_4I_5$, $RbAg_4I_5$ and $NH_4Ag_4I_5$. Furthermore, these compounds are isomorphous, show substantially identical X-ray diffraction patterns, and may be combined in any desired proportions. M, for example, may be made up of $K_a$, $Rb_b$, $(NH_4)_c$, and $Cs_d$, where the sum of $a$, $b$, $c$, and $d$ is equal to one, and $a$, $b$, and $c$ may have individual values from zero to one, inclusive, and $d$ may vary from zero to one half. It has been found, for example, that when M is composed of both potassium and rubidium, varying in atomic percent from 10 to 80 K and from 90 to 20 Rb, the ionic conductivity of the resultant composition in air at room temperature is substantially constant over the entire range of composition.

The ionic conductivities of the compositions of matter, and particularly of the conductivity-imparting components thereof, used in the solid state electrochemical devices provided by this invention are markedly higher than those of the best known solid ionic conductors at or near room temperature. At 20° C., the ionic conductivities of $KAg_4I_5$, $RbAg_4I_5$, and $NH_4Ag_4I_5$ are about 0.2 ohm-cm.$^{-1}$. The electronic conductivity component is essentially negligible, being less than $10^{-8}$ ohm-cm.$^{-1}$. Thus compared with silver iodide, whose ionic conductivity is of the order of $10^{-6}$ ohm-cm.$^{-1}$, the ionic conductivities of the materials used in the present invention are from $10^5$ to $10^6$ times higher. Compared with the best of the known materials, viz., $Ag_3SI$, the ionic conductivities of the materials used in this invention at or near room temperature are higher by a factor of about 20. As a consequence of their superior ionic conductivity, the materials used in this invention when used in the form of thin-film electrolytes produce cells having a lower internal resistance than those made with comparable films of the known materials. Alternatively, cells may be prepared using thicker layers of electrolyte of the materials of this invention and yet present no greater internal electrical resistance than cells made with considerably thinner layers of the hitherto known solid ionic conductors. For a more detailed description of the properties of these solid ionic conductors and of methods for their preparation, reference should be made to our copending application Ser. No. 569,193, entitled "Solid Ionic Conductors," filed Aug. 1, 1966, and assigned to the assignee of this invention.

Other and further objects, advantages and features of the present invention will become apparent from the following description of a preferred embodiment of the invention, taken in conjunction with the accompanying drawing, in which.

Figure 1:
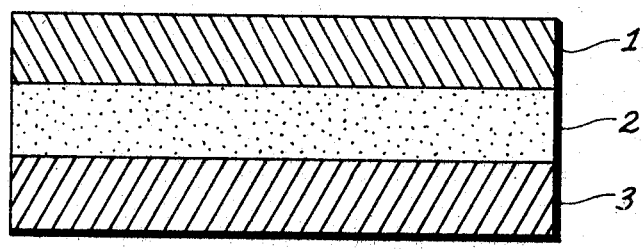
FIG. 1 is a cross-sectional view of an idealized embodiment of a solid state electric cell provided by this invention.

Referring to FIG. 1, wherein the several layers are shown in a nonscalar, simplified form, an anode 1 consists of any suitable metallic conductor which functions as an electron donor. Preferably, silver is used as the anode material, as a thin sheet or foil, although copper and other materials may also be utilized. The crux of the present invention lies in the composition of the electrolyte layer 2, which includes the solid ionic conductors having the formula $MAg_4I_5$ where M is selected from the class consisting of K, Rb, $NH_4$, Cs, and combinations thereof, Cs being present only as a minor constituent of M. In addition, adventitious impurities or deliverately added excess amounts of up to about 80 mole percent AgI or 40 mole percent MI in $MAg_4I_5$ may be present without unduly reducing the conductivity. For other applications, it may be desirable to include even greater amounts of AgI, MI or other materials where it is desired to have a preselected conductivity value present. Also, certain additions may be made to the electrolyte 2 for purposes of moisture absorption, stability or the like. A cathode 3 consists generally of a nonmetal capable of functioning as an electron acceptor, such materials being capable of oxidation by any of the electron donors which are used as anodes or capable of forming alloys with same (e.g., Pd, Pt, etc.). Several such suitable cathode materials are shown in U.S. Re. Patent 24,408. Because of its relatively low volatility iodine is favored as a cathode material. Conveniently, it is intermixed with carbon to form the electrode because of the electronic conductivity of carbon. However, the relative proportions of carbon and iodine are not critical in the range from 10 to 90 weight percent iodine. About 30 weight percent iodine is convenient and preferred. A preferred cell in accordance with this invention is, for example, $Ag/RbAg_4I_5/I_2+C$. Another suitable and preferred cell is $Ag/[MAg_3I_4]/I_2+C$. The empirical formula $MAg_3I_4$ is enclosed in brackets to show that this composition of matter is not a single-phase compound. The conductive composition has the empirical formula $MAg_3I_4$ and contains 75 mole percent AgI and 25 mole percent MI which are reacted to form a mixture consisting of the conductivity-imparting component $MAg_4I_5$ plus a second high-resistivity phase. Such a mixture may be used because of convenience in its preparation by a low temperature precipitation from a ketonic solvent. The conductivity of such a mixture is about 0.16 ohm-cm.$^{-1}$, with its conductivity due to the presence of $MAg_4I_5$ in the mixture. The nonconductive phases in such a mixture may include $M_2AgI_3$, or MI, depending on the particular system and method of preparation.

In general, it is preferred to encapsulate the cell with a protective resin or other potting compound after electrical leads or contacts, not shown, have been attached to the electrodes. This encapsulation prevents absorption of moisture by the electrolyte, and is also particularly effective where iodine is used as cathode material in preventing loss of iodine by diffusion. While iodine dispersed in a carbon matrix is preferred as cathode material, other electron acceptor materials may also be used, e.g., $Ag_2S+I_2$, $V_2O_5$, $RbI_3$, $CsI_3$, $CsI_5$, $NH_4I_3$.

Figure 2:
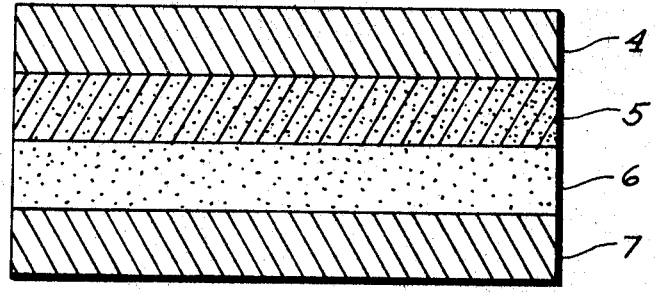
FIG. 2 is a cross-sectional view of a second embodiment of an electric cell of this invention.
Figure 3:
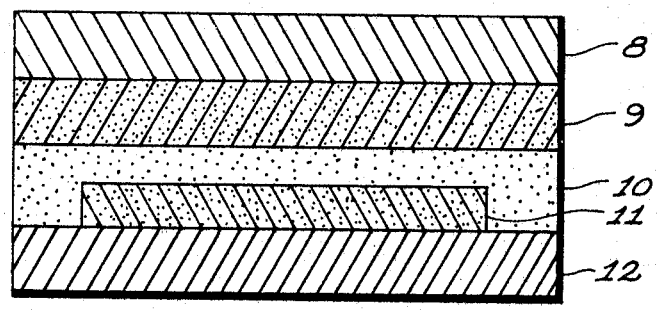
FIG. 3 is a cross-sectional view of a third embodiment of an electric cell of this invention.

In FIG. 2 is shown a nonscalar electric cell construction in which there is provided a composite anode consisting of an electronically conductive layer 4, e.g., silver, Ta, Cu, etc., and in contact therewith is a mixed anode layer 5 consisting of the anode material in admixture with the material used for the solid electrolyte, and which may optionally include carbon. An electrolyte layer 6 is in contact with the mixed anode layer 5. The cathode 7 contains electrolyte material in admixture with electron acceptor material. Preferably, for suitable electrical contact, a nonreactive electronically conductive layer, not shown, may optionally be used to overlay the cathode 7, e.g., Ta. Thus a typical cell of this construction will consist of $Ag/Ag+[MAg_3I_4]/[MAg_3I_4]/I_2+C+[MAg_3I_4]/Ta$ In FIG. 3 is shown a nonscalar, particularly preferred further embodiment of this invention in which a solid state electric cell is provided with both a modified anode and cathode construction. The composite anode consists of an electronically conducting layer 8, e.g., Ag, in contact with a mixed anode layer 9 of silver containing dispersed therein carbon and electrolyte material. An electrolyte layer 10 is selected from the ionic conductors as used herein. The composite cathode consists of a layer 11 of electron acceptor material, e.g., $I_2+C$, containing electrolyte material dispersed therein. As a matter of preferred construction, layer 11 has been shown as not being coextensive with a conductive layer 12. By having layer 11 in contact with layer 12, but not coextensive therewith, possible short circuiting is prevented. Also, where iodine is used as the cathode material, it is more conveniently retained in the carbon matrix. Layer 12 consists of a suitable electronically conductive material nonreactive with the cathode material, e.g., tantalum, molybdenum, niobium, carbon, or various conductive plastics which are essentially nonreactive with iodine.

It has been found that electric cells prepared as shown in FIGS. 2 and 3 have enhanced electrical properties with respect to voltage and current compared with electric cells prepared in accordance with FIG. 1. The type of solid state electric cell construction illustrated for FIGS. 2 and 3 herein, which results in solid state cells with improved electrical characteristics, is more broadly shown and claimed in copending application Ser. No. 573,744, entitled "Solid State Cell Construction," filed Aug. 1, 1966, and assigned to the assignee of the present invention. Reference should be made to this application for a more detailed explanation of a possible mechanism of operation of this type of electric cell, as well as its various features and advantages.

The following examples are illustrative of the practice of this invention with respect to a preferred embodiment relating to a solid state electric cell, but are not to be construed as limiting with reference to other solid state electrochemical devices or with respect to optimiaztion of cell current and voltage, which are functions of the material selected for electrodes and electrolyte, cell construction techniques, and overall internal resistance of the cell as determined by electrolyte layer thickness, contact resistance between adjacent layers, and other cell parameters, Optimization of these several parameters may be achieved by experimentation in accordance with the teachings of this invention and the known art relating to solid state cells.

EXAMPLE 1

Electric cell utilizing conductive composition having empirical formula $KAg_3I_4$ A cell was constructed substantially similar to that shown in FIG. 1 consisting of a 0.125 mm. thick silver foil anode, a 6-mm. thick pellet of the conductive composition having the empirical formula $KAg_3I_4$ as electrolyte, and a 20% iodine-80% carbon pellet as the cathode. A current density of 20.5 ma./cm.$^2$ was obtained across a 50-ohm load at 0.40 volt when the cell was maintained at a temperature above 35° C. This current is approximately 40 times that reported for $Ag_3Si$ cells and 20,000 times better than that reported for any other solid state battery. An open circuit voltage of 0.68 volt was obtained in agreement with a theoretical value of 0.687 volt. The cell was operated for 7 hours at an average current density of 1.2 ma./cm.$^2$. A 6-cell battery was assembled having an open circuit voltage of 4.2 volts, and was used successfully to operate a commercial transistor radio.

EXAMPLE 2

Preparation of electric cell having composite electrodes

Silver metal for the mixed anode layer is prepared either by reduction of silver nitrate by copper or by reduction of silver oxide by carbon. The silver is then intimately mixed with equal amounts of carbon and of electrolyte material. The mixture is heated to at least the melting point of the electrolyte, cooled and then ground to a fine powder. The electrolyte is sieved through a 250-mesh U.S. Standard sieve before use in the cell. The cathde is prepared by mixing carbon and the electrolyte in equal proportions, heating to the melting point of the electrolyte, quenching and then grinding the material together while adding iodine thereto.

For a typical 100-milliampere-hour cell, about 0.5 g. $I_2+C+$electrolyte material is placed in a one inch stainless steel die and pressed at 18,000 lb. The resultant pressed disk is then placed in a second insulated die, and an appropriate amount of electrolyte material is added to the die. By using a slightly oversized die and pressing onto the cathode disk at about 18,000 lb., a cup of electrolyte is formed around the cathode. Then an appropriate amount of anode material (0.5 g. Ag+C+electrolyte is equivalent to a 100-milliampere-hour cell) is placed into the die on top of the previously pressed electrolyte and pressed at 18,000 lb. The cell is now formed. Tantalum foils are placed over the anode and the cathode for convenience in effecting electrical contact. The complete assembly is then preferably encapsulated in an epoxy-type resin so as to give both a cell of rugged construction and one that is protected from atmospheric corrosion. This cell construction essentially is that of the embodiment shown in an idealized view in FIG. 3.

EXAMPLE 3

Improvement by use of electric cell with composite electrodes

The following electric cells were prepared essentially as shown for Example 2, using composite cathodes and with both individual and composite anodes, and were found to have the following characteristics:

| Cell No. | Anode Comp. | Electrolyte | Cathode Comp. | Int. Res., ohms | Silver Utilization, Percent |
|---|---|---|---|---|---|
| 1 | 1 gm. Ag | 2 gm. [$RbAg_3I_4$] | .5 gm. $I_2$, 1 gm. C, .5 gm. [$RbAg_3I_4$]. | 1.1 | 12 |
| 2 | 1 gm. [$RbAg_3I_4$] .5 gm. Ag., 1 gm. C. | 3 gm. [$RbAg_3I_4$] | .5 gm. $I_2$, 1 gm. C, 3.0 gm. [$RbAg_3I_4$]. | .2 | 70 |

As may be noted from a comparison of the two cells using the conductive composition having the empirical formula $RbAg_3I_4$ as electrolyte, upon incorporation of electrolyte also in the silver anode, the internal resistance of the cell is reduced markedly, in part by decreasing the anode electrolyte contact resistance. However, more importantly, the utilization of silver is almost sixfold greater in the composite anode cell compared to the other type of cell.

EXAMPLE 4

Cu/[$RbAg_3I_4$]/$I_2$ cell

A cell was also constructed in which the silver anode was replaced by a copper anode, following essentially the procedure shown in Example 1. The resultant cell has an open circuit voltage of 0.68 volt and a flash current of 15 ma./cm.$^2$. A continuous current of 0.1 ma./cm.$^2$ was drawn for several hours.

EXAMPLE 5

Ag/$RbAg_4I_5$/$I_2$, C, $RbAg_4I_5$

The materials comprising the composite cathode were intimately mixed together and consisted of 3.0 gm. $RbAg_4I_5$, 0.5 gm. C, and 0.5 gm. $I_2$. The material was then pressed into a one-inch diameter pellet. On top of this pellet was then pressed 3.0 gm. RbAg$_4$I$_5$. A 3.0-gm. silver foil, about 40 mils thick, was pressed onto the electrolyte layer to form the completed cell. The open circuit voltage of the cell was 0.660 volt, and a flash current of 40 ma. and an internal resistance of 12 ohms were measured.

It will of course be understood that many variations may be made with respect to the solid state electrochmeical devices provided by this invention without departing from the inventive concept herein. With respect to details of construction relating to the preferred embodiment of solid state electric cells, substantially all of the improved features of construction used for conventional solid state electric cells, in order to minimize polarization and pressure cathode and anode stability and the like, may be readily utilized with little or no modification for the cell construction taught herein, with the further advantage of obtaining highly superior electric cell characteristics because of the unusually high ionic conductivity of the electrolytes used herewith. Furthermore, inasmuch as the ionic conductivity of the electrolyte materials of this invention is essentially due to silver ions, as determined by transport number measurements, the teachings of the prior art with respect to solid state electric cells employing silver halide electrolytes are of particular interest and may be advantageously applied with respect to the novel electric cell herein which utilizes as principal electrolyte constituent the novel solid ionic conductors hereof. Also, while the electric cell of this invention is of principal interest and utility as a primary cell, it may also be utilized as a secondary cell, particularly by selecting a cathode electron acceptor, e.g., a sulfide, which produces a reaction product with silver having a lower decomposition potential than that of the solid electrolytes hereof. Because of the unusually high ionic conductivity shown by the electrolytes used in the practice of this invention over a wide temperature range from about −150° C. to about 230° C., the solid state electric cells of this invention are of further utility at both low and high temperatures or where cycling of a cell over a wide temperature range is required. A means of containment of the iodine must of course be used at the higher temperature.

We claim:

1. An electrochemical device which includes a solid electrolyte element comprising an ionically conductive composition of matter wherein the conductivity-imparting component has the formula MAg$_4$I$_5$ where M is selected from the class consisting of K, Rb, NH$_4$, Cs and combinations thereof, Cs being present only as a minor constituent of M, and means for providing a flow of ions through said electrolyte element.

2. A device according to claim 1 where M consists essentially of from 10 to 80 atomic percent K and from 90 to 20 atomic percent Rb.

3. A solid state electric cell comprising an anode, a cathode, and a solid electrolyte disposed between said anode and said cathode, said electrolyte comprising an ionically conductive composition of matter wherein the conductivity-imparting component has the formula MAg$_4$I$_5$ where M is selected from the class consisting of K, Rb, NH$_4$, Cs, and combinations thereof, Cs being present only as a minor constituent of M.

4. A cell according to claim 3 where M is Rb.

5. A cell according to claim 3 where M is NH$_4$.

6. A cell according to claim 3 where M is K.

7. A cell according to claim 3 where M consists essentially of from 10 to 80 atomic percent K and from 90 to 20 atomic percent Rb.

8. A cell according to claim 3 wherein said anode comprises silver and said cathode comprises an intimate mixture of carbon and iodine.

9. A cell according to claim 3 wherein at least one of said anode and cathode includes solid electrolyte material dispersed therein.

10. A cell according to claim 3 wherein each of said cathode and anode includes solid electrolyte material dispersed therein.

11. A cell according to claim 3 wherein said anode comprises a composite anode of an electronically conductive layer and an overlying layer of an intimate electronically conductive mixture of silver and said solid electrolyte, said cathode comprises a composite cathode of a layer of an electronically conductive material chemically inert to iodine and an overlying layer of an electronically conductive intimate mixture of carbon, iodine and said electrolyte, and said electrolyte layer is in contact with said cathode and anode layer portions which contain said electrolyte in admixture.

12. A solid state electric cell comprising an anode, a cathode, and a solid electrolyte disposed between said anode and said cathode, said electrolyte comprising an ionically conductive composition of matter having the empirical formula MAg$_3$I$_4$ where M is selected from the class consisting of K, Rb, NH$_4$, and combinations thereof.

13. A cell according to claim 12 wherein said anode comprises silver and said cathode comprises an intimate mixture of carbon and iodine.

14. A cell according to claim 12 wherein at least one of said anode and cathode includes solid electrolyte material dispersed therein.

References Cited

UNITED STATES PATENTS

| 3,117,035 | 1/1964 | Mrgudich | 136—83 |
| 3,170,817 | 2/1965 | Mrgudich | 136—83 |

WINSTON A. DOUGLAS, *Primary Examiner.*

C. F. LE FEVOUR, *Assistant Examiner.*

U.S. Cl. X.R.

136—153

PO-1050
(5/69)

UNITED STATES PATENT OFFICE
CERTIFICATE OF CORRECTION

Patent No. 3,443,997                    Dated    May 13, 1969

Inventor(s) G. R. Argue et al

It is certified that error appears in the above-identified patent and that said Letters Patent are hereby corrected as shown below:

Column 1, line 64 after "ohms" insert --even--.
Column 4, line 8 "deliverately" should read --deliberately--.
Column 5, Table - Cell No. 2 under Anode Comp. formula should read --1 gm. $[RbAg_3I_4]$, .5 gm. Ag, .1 gm.C.--.
Column 6, line 10 "cathde" should read --cathode--.
Column 7, line 10 "chmeical" should read --chemical--;
Column 7, line 16 "pressure" should read --assure--.

Signed and sealed this 6th day of March 1973.

(SEAL)
Attest:

EDWARD M. FLETCHER, JR.              ROBERT GOTTSCHALK
Attesting Officer                    Commissioner of Patents